United States Patent [19]
Furuya et al.

[11] Patent Number: 5,214,694
[45] Date of Patent: May 25, 1993

[54] SCRAMBLE SIGNAL TRANSMISSION SYSTEM FOR EARTH STATION OF COMMUNICATION SATELLITE

[75] Inventors: Tsuneo Furuya; Fujiyuki Fukamatsu; Yasuaki Yamagishi; Yoshimoto Muratsubaki, all of Kanagawa, Japan

[73] Assignee: Sony Corporation, Tokyo, Japan

[21] Appl. No.: 672,440

[22] Filed: Mar. 20, 1991

[30] Foreign Application Priority Data

Mar. 20, 1990 [JP] Japan ................................. 2-71552

[51] Int. Cl.⁵ ............................................. H04K 1/00
[52] U.S. Cl. ............................................ 380/2; 380/9; 380/33; 380/49
[58] Field of Search ..................... 380/2, 9, 10, 33, 49

[56] References Cited

U.S. PATENT DOCUMENTS 5,022,076  6/1991  Rosenow et al. ...................... 380/2

Primary Examiner—Bernarr E. Gregory
Attorney, Agent, or Firm—Hill, Steadman & Simpson

[57] ABSTRACT

A system for transmitting a scramble signal for a sky port scramble system including an organization center for organizing data relating to customers etc. and first and second control units each having a system controller and a scrambler for performing the scramble processing on the basis of the customer data sent from the organization center. In a normal state, the organization center communicates with one of the first and second control units and each of the first and second control units is operated in the same manner. In case of the occurrence of an abnormality or a fault in the communication control unit, only the other control unit is operated and the organization center communicates with the other control unit instead.

1 Claim, 3 Drawing Sheets

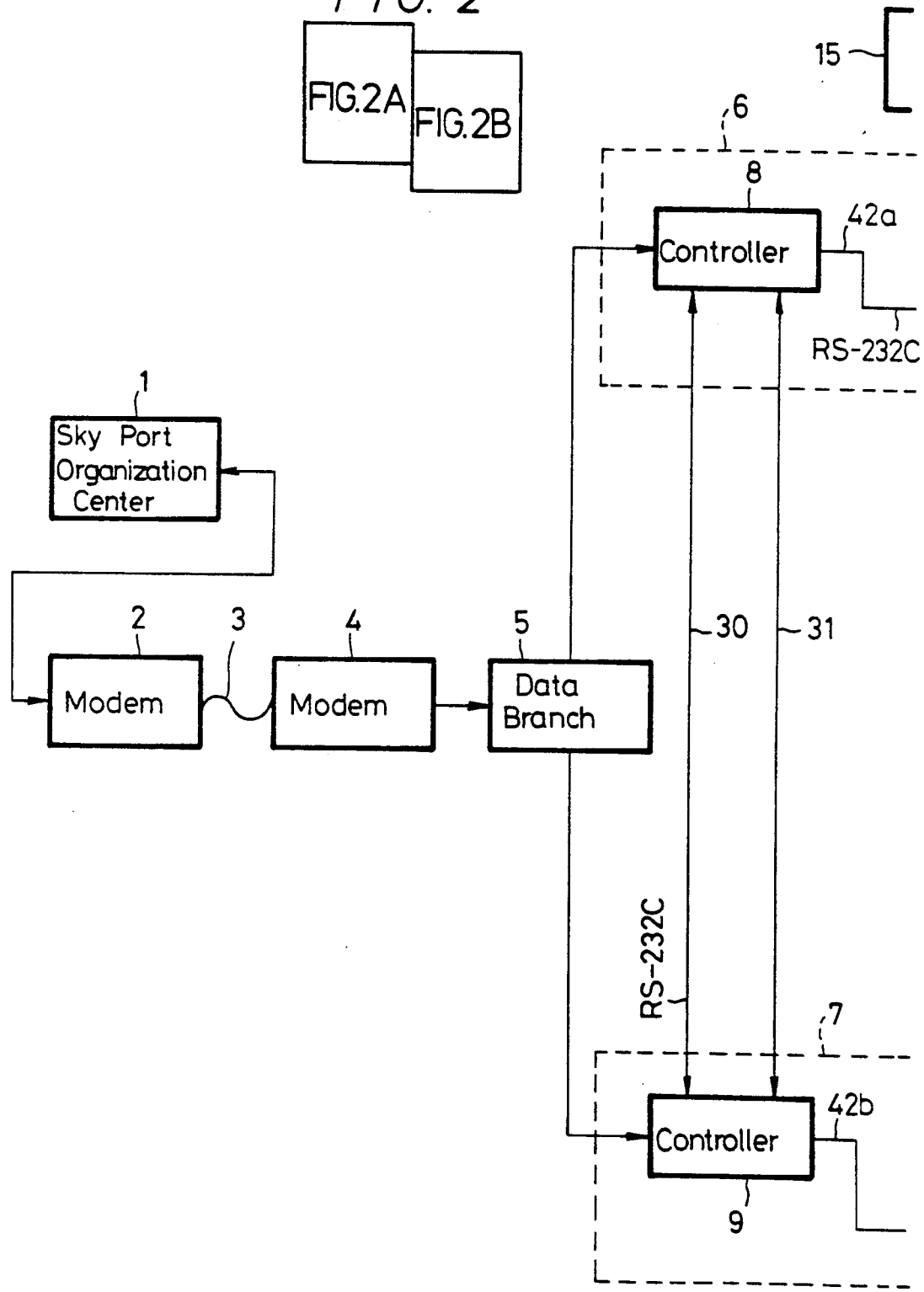

SCRAMBLE SIGNAL TRANSMISSION SYSTEM FOR EARTH STATION OF COMMUNICATION SATELLITE

BACKGROUND OF THE INVENTION

1. Field of the Invention

The present invention relates to an improved system for transmitting a scramble signal for a sky port scramble system.

2. Description of the Prior art

In recent years, it has been proposed to provide such a sky port scramble system that toll information such as a video signal, an audio signal or the like is provided to particular receiving contractors by using a communication satellite or a broadcasting satellite. In the scramble system such as the sky port scramble system, in order to keep an audio signal or a video signal to be transmitted in electrically secret, a signal switching system within the scanning line or a scanning line transfer system etc. is applied to a video signal etc. and also a pseudo random signal additive system etc. are applied to an audio signal etc.

Also, it has been proposed to provide such a business television system or the like that various kinds of video, audio and digital data or the like are transmitted between enterprises by using the scramble system so as to keep the data in secret. An example of this conventional business television system is shown in FIG. 1.

In FIG. 1, video or audio data or the like to be transmitted is supplied from a data source 19 to an active unit 21 constituting a first control system through a movable contact a and a stationary contact b of a switch 20. The first control system 21 includes a controller 23 and a scrambler 25. The data applied to the first control system 21 from the data source 19 is subjected to a predetermined scramble and then delivered as an output signal to a transmitter etc. through a switcher 27 to thereby be broadcast in accordance with a predetermined transmission system.

A standby unit 22 constituting a second control system and connected to another stationary contact c of the switch 20 includes a controller 24 and a scrambler 26 which have the same constructions as those of the controller 23 and the scrambler 25 of the active unit 21, respectively. The output signal from the second control unit 23 is applied to the switcher 27.

In this conventional system, if a fault occurs in the active unit 21 or the first control system, by changing over the movable contact a of the switch 20 to the stationary contact c to which the standby unit or the second control unit 22 is connected, the output data from the data source 19 can be transmitted.

In the conventional business television system of FIG. 1, however, in order to make the data state of the standby unit 22 concident with the current data state of the active unit 21 in a faulty state, it is insufficient to merely change over the switch 20 because the current data of the active unit 21 stored in a floppy disk etc. thereof have to be transmitted to the standby unit 22 and to make its data state concident with that of the active unit 21. Namely, it requires complicated procedures and takes much time to make the data state of the standby unit 22 coincide with the current data state of the faulty active unit 21.

This business television system may be applied to the sky port scramble system. However, in case of allotting addresses independently to respective customers who receive the data in this sky port scramble system, the number of the addresses in the business television system will be several thousands, while the number of the addresses in the sky port scramble system will be 25 millions at maximum. Thus, in the system where the business television system is applied to the sky port scramble system, it takes quite much time to make the data state of the standby unit 22 coincide with the current data state of the faulty active unit 21. Further, even if a fault or an obstacle occurs at independently authorized receivers etc., e.g. particular ones among 25 million receivers etc., many viewers or receiving contractors are affected by the fault.

OBJECTS AND SUMMARY OF THE INVENTION

Accordingly, it is an object of the present invention to provide a scramble signal transmitting system overcoming the above-described conventional drawbacks.

It is another object of the present invention to provide a scramble signal transmitting system having an improved reliability which is capable of restoring a sky port scramble system even if a fault occurs in the system.

It is still another object of the present invention to provide a scramble signal transmitting system which is capable of restoring the system in short time period even if a fault occurs in the system.

According to an aspect of the present invention, there is provided a method of transmitting a scramble signal for a sky port scramble system including an organization center for organizing data relating to customers etc. and first and second control units each having a system controller and a scrambler for performing the scramble operation on the basis of the customer data sent from the organization center, comprising the step of communicating the organization center with one of the first and second control units in a normal state, operating each of the first and second control units in the same manner in the normal state, and in case of the occurrence of an abnormality or a fault in the one of the first and second control units, operating only the other of the first and second units and communicating the organization center with the other control unit instead of the one control unit.

The above and other objects, features, and advantages of the present invention will become apparent from the following detailed description of an illustrative embodiment thereof to be read in conjunction with the accompanying drawings, in which like reference numerals represent the same or similar parts.

DETAILED DESCRIPTION OF THE PREFERRED EMBODIMENT

Figure 1:
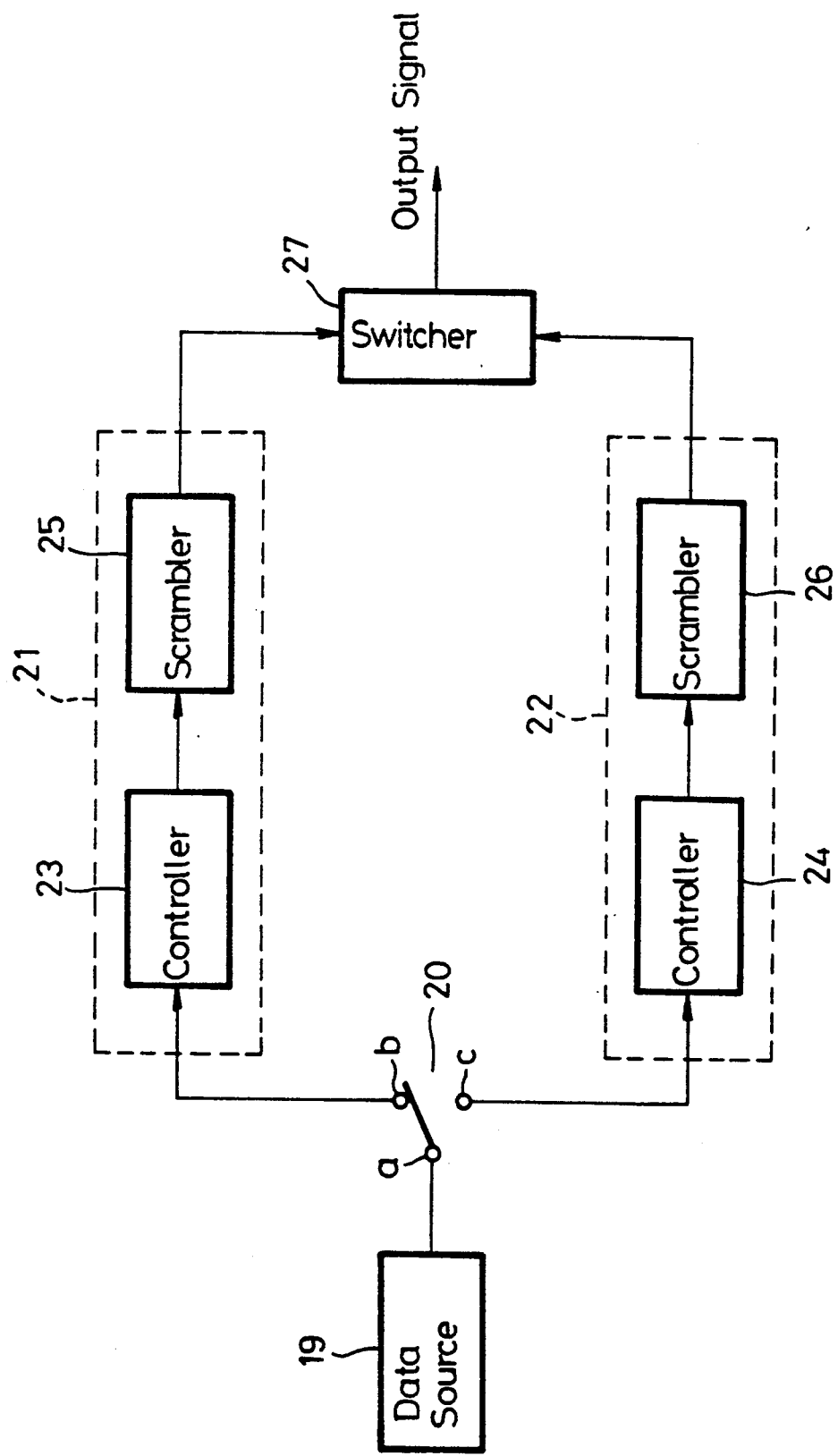
FIG. 1 is a block diagram illustrating a conventional business television system.
Figure 2B:
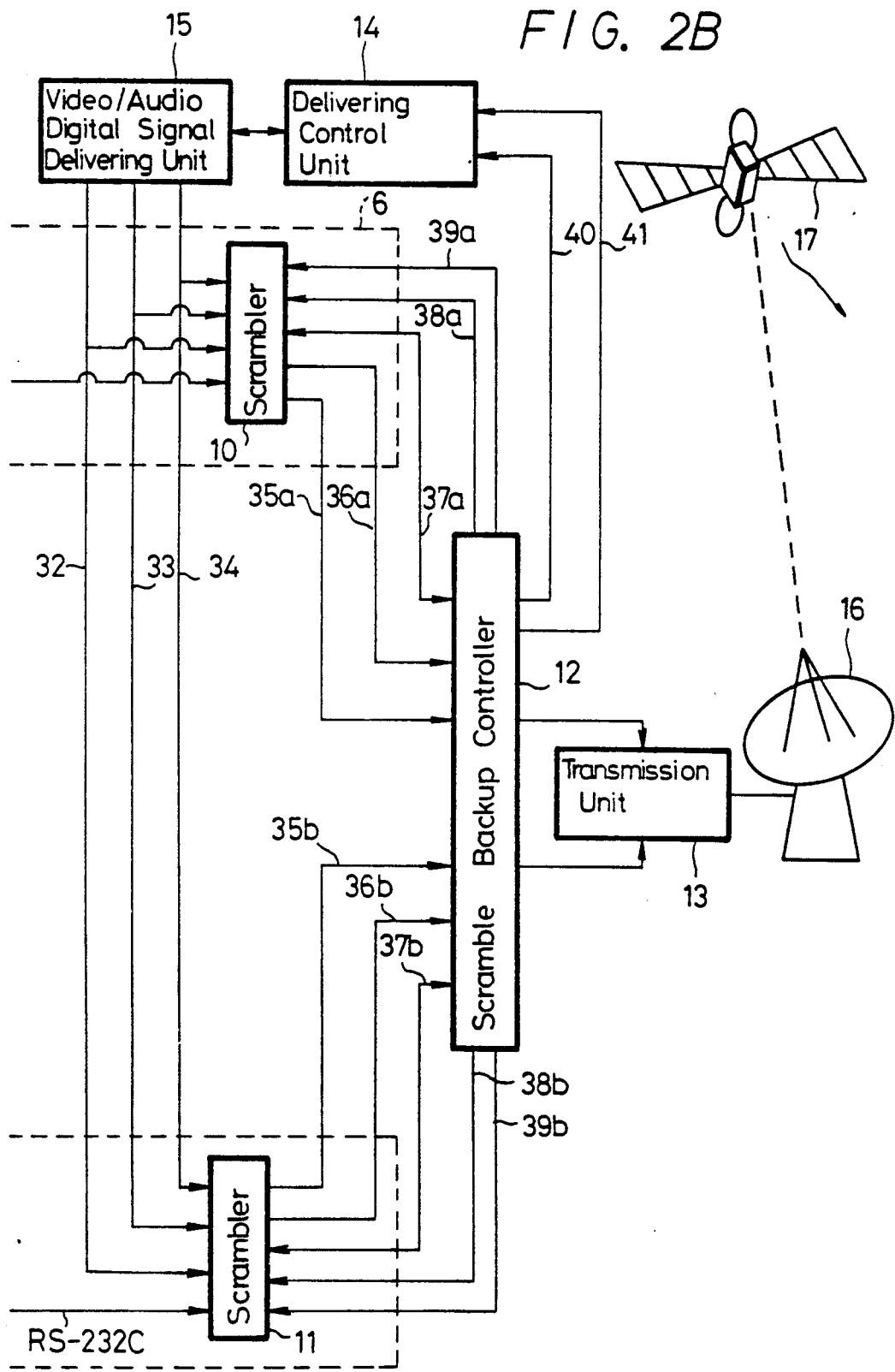
FIG. 2 (formed of FIGS. 2A and 2B) drawn on two sheets of drawing so as to permit the use of a suitable large scale) is a block diagram illustrating a sky port scramble system to which a scramble signal transmitting system of the present invention is applied.

A scramble signal transmitting system according to the present invention will be described with reference to FIG. 2. FIG. 2 (formed of FIGS. 2A and 2B drawn on two sheets of drawings so as to permit the use of a suitably large scale) shows a sky port scramble system to which an embodiment of the present invention is applied.

The sky port scramble system generally provides toll information such as video, audio, digital data and so on to particular viewers, i.e. receiving contractors by using a communication satellite. In this system, the data to be transmitted is subjected to scramble and encryption processings and then transmitted so as for viewers other than the receiving contractors not to be able to listen and look the data. The toll data thus subjected to the scramble and encryption processings can be received and viewed (or listened to) at receivers or receiver sides only by descrambling the transmitted data.

The sky port scramble system is constituted by a sky port organization center, an earth station, a communication satellite and customers. The organization center performs collectively organization of customers such as admission, contract and cancellation of a customer, modification of the contract, charging procedures and organization of customer data etc. The earth station transmits a transmission signal, which is subjected to scramble and encryption procedures in accordance with customer data sent from the organization center, to the communication satellite via a radio wave. The communication satellite receives the radio wave transmitted from the earth station and then transmits the wave to the ground. The customers are receiving contractors each having a receiver (a video receiver) for receiving a radio wave transmitted from the satellite and a descrambler and listening and looking the toll data.

The present invention relates to a scramble signal transmitting system in the earth station of such a type of sky port scramble system including a data branch, controllers, scramblers and a scrambler backup controller, as shown in FIG. 2. In FIG. 2, a sky port organization center 1 of the earth station transmits customer data and command data etc. from a host computer (e.g. a central processing unit (CPU)) therein to a modem (modulation and demodulation) 4 provided in a control unit having a scrambler through a modem 2 and a dedicated line 3. The modem 4 supplies the received data to a data branch 5 which in turn branches the data simultaneously in parallel to a first control unit (e.g. an active unit) 6 and a second control unit (e.g. a standby unit) 7 so as to process the data in each of the control units at the same time. However, the data communication (transmission and reception) to the CPU in the organization center 1 is performed only by the active unit 6. Each of the first and second control units 6 and 7 has controllers 8, 9 and scramblers 10, 11. Each of the controllers 8 and 9 with the same construction has a hard disk which stores thereon identification (hereinafter abbreviated as an ID) number, organization data etc. of the customer data. Each of the scramblers 10 and 11 with the same construction is supplied with a video signal 32 and right and left channel audio signals 33 and 34 from a video/audio digital signal delivering unit 15 which is controlled by a delivering control unit 14. Further, the transmission and reception of a digital data 41 and a mode/control data 40 are performed between a scrambler backup controller 12 and the delivering control unit 14, as described later. The data transmission and reception between the controllers 8, 9 and the scramblers 10, 11 are performed through data lines RS-232C 42a and 42b, respectively. Further, the data transmission and reception between the controllers 8 and 9 are performed by a data line RS-232C 30 and an inner-network line 31 which makes the high-speed data transmission and reception possible. The inner-network is a local network in accord with IEEE 802.3, employs the Carrier Sense Multiple Access with Collision Detection (CSMA/CD) as a medium accessing system and uses the Transmission Control Protocol/Internet Protocol (TCP/IP) as a communication protocol. The controllers 8 and 9 act as terminal devices of the TCP/IP. The scramblers 10 and 11 of the active and standby units 6 and 7 constituting the first and second control units supply to the scrambler backup controller 12 video signals 36a and 36b each subjected to the scramble and encryption processings, subcarrier signals 35a and 35b and bit stream signals described later etc., respectively. The scrambler backup controller 12 supplies to the scramblers 10 and 11 digital data 37a and 37b, mode data 38a and 38b and status check data 39a and 39b etc., respectively. Each of the digital data 37a and 37b which is a serial data with a transmission rate of 64 kilo bit per second (kBPS) or 256kBPS, for example, is synchronized with a clock and a frame sync. signal by the controller 12 and then applied to the scramblers 10 and 11. The video signal 32 applied from the video/audio digital signal delivering unit 15 to the scramblers 10 and 11 is accorded with the National Television System Committee's System (NTSC system). The video signal 32 is subjected to a scramble processing in each of the scramblers 10 and 11 by being subjected to a line shuffling processing by using a frame memory. Each of the scramblers 10 and 11 can receive the audio signals 33 and 34 of 4 channels at maximum and performs the scramble processing for the audio signals by performing a pulse code modulation (PCM) in accordance with an input mode. Each of the scramblers 10 and 11 receives service data for service information from the organization center 1 through the controllers 8 and 9 and the lines RS-232C 42a and 42b, respectively. The ID number organization data have a message flag and authorized data which designate for each customer which data among the video audio, and digital data is made possible to be received by the customer. The ID number organization data is supplied from the authorization center 1 to the controllers 8 and 9 and stored in the hard discs thereof and also to the scramblers 10 and 11 and stored in the memories thereof, respectively.

In case of modifying the ID number organization data, the organization center 1 sends only the modification data to the controllers 8 and 9 and the scramblers 10 and 11 to thereby modify the contents of the hard disks and the memories thereof, respectively.

Each of the scramblers 10 and 11 integrates the digital audio data which is formed by subjecting the audio signal to the pulse code modulation, the digital data 37a and 37b, the service data and the ID number organization data in accordance with a predetermined format and adds a header etc. to the integrated data to form the bit stream signal and outputs the same to the scrambler backup controller 12 as a four-phase differential phase shift keying (DPSK) signal. The output signals from the scramblers 10 and 11 are supplied to the transmission unit 13 through the scramble backup controller 12 and transmitted to the communication satellite 17 from a transmission antenna 16 as a radio ware. The communication satellite 17 transmits the toll data which was subjected to the scramble processing to the customers. Each of the customers can listen to and view the toll data by performing the descramble processing for the toll scramble data which is received by a receiver.

As described above, in this embodiment of the sky port scramble system according to the present invention, both the active and the standby units 6 and 7 are operated in parallel and receive the data from the organization center 1, and the execution of the communication accorded with the communication protocol with the host CPU of the organization center 1 is performed only by the active unit 6.

Further, in this embodiment, a fault or abnormality of each of the controllers 8 and 9 themselves and the scramblers 10 and 11 themselves, the disagreement of the data between the hard disks of the controllers 8 and 9 and the memories of the scramblers 10 and 11 etc. are detected. Namely, the fault or abnormality of each of the controllers 8 and 9 is detected by detecting the abnormality of a central processing unit (CPU), an input/output unit or a memory etc. thereof and also detected by mutually monitoring the controllers 8 and 9 through the line RS-232C 30. Each of the scramblers 10 and 11 has a detecting unit for detecting the fault or abnormality of hardware thereof, and so each of the scramblers delivers an alarm signal such as a video circuit error alarm signal, a memory error alarm signal and a PCM error alarm signal when an abnormality or fault is detected by the detecting unit thereof. When the signal indicating the abnormality or fault of the controller 8 or the scrambler 10 of the active unit 6 is applied to the scramble backup controller 12, the controller 12 changes the operation mode from the active unit. 6 to the standby unit 7 which then acts as the active unit. Thus, the video data etc. to be transmitted is delivered to the transmission unit 13 from the control unit 7 instead of the control unit 6. Accordingly, the data communication (transmission and reception) accorded with the communication protocol is executed between the control unit 7 and the host CPU of the organization center 1.

The fault or abnormality part of the control unit 6 is repaired in accordance with the status data indicating the detected abnormality or fault. In this case, since there may be the disagreement of the contents between the hard disks of the controllers 8 and 9 and the memories of the scramblers 10 and 11, the contents must be down-loaded from the hard disk or memory of the control unit in the active mode at that time (in this case, the control unit 7) and as the customer data and various status information related thereto upon the repair of the fault part of the control unit 6 are loaded into the hard disk of the controller 8 and the memory of the scrambler 10 of the fault control unit 6. This data down-loading is performed at high speed through the internetwork line 31 and so the data loading of the authorized addresses of 25 millions can be performed quickly.

According to the present invention thus operated, the sky port scramble system can continue the operation normally even if the active unit becomes faulty, so that there is provided with the scramble signal transmission system with a high reliability which always enables the viewers to look and listen to the toll data in the normal state and can perform the repairing operation quickly in case of the occurrence of the abnormality or fault.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

We claim as our invention

1. A system for transmitting a scrambled signal, said system including an organization center for organizing data relative to customers, and first and second control units connected to said organization center, each of said control units having a system controller and a scrambler for performing scrambling processing of information signals in response to customer data sent from the organization center, comprising:
   a) means for communication between said organization center and one of said first and second control units in a first state in which said one control unit operates without fault;
   b) means for operating each of said first and second control units identically in said first state;
   c) means for operating only the other of said first and second control units, and for communicating between the organization center and said other control unit, in case of the occurrence of a fault in the communication of said one control unit; and
   d) means operative when said one control unit is again operative without fault for transmitting said customer data from said other control unit to said one control unit through a line interconnected between said one control unit and said other control unit.

* * * * *